US012366962B2

(12) United States Patent
Golez et al.

(10) Patent No.: US 12,366,962 B2
(45) Date of Patent: Jul. 22, 2025

(54) SYSTEM METHOD FOR IMPROVING READ COMMAND PROCESS TIMES IN SOLID-STATE DRIVES (SSD) BY HAVING PROCESSOR SPLIT-UP BACKGROUND WRITES BASED ON DETERMINED COMMAND SIZE

(71) Applicant: SK hynix NAND Product Solutions Corporation, San Jose, CA (US)

(72) Inventors: Mark Anthony Sumabat Golez, Folsom, CA (US); Henry Chu, Rancho Cordova, CA (US); Darshan Mallapur Vishwanath, Santa Clara, CA (US); Sarvesh Varakabe Gangadhar, San Jose, CA (US); David J. Pelster, Longmont, CO (US)

(73) Assignee: SK hynix NAND Product Solutions Corporation, Rancho Cordova, CA (US)

( * ) Notice: Subject to any disclaimer, the term of this patent is extended or adjusted under 35 U.S.C. 154(b) by 33 days.

(21) Appl. No.: 18/090,358

(22) Filed: Dec. 28, 2022

(65) Prior Publication Data

US 2024/0220111 A1 Jul. 4, 2024

(51) Int. Cl.
*G06F 3/00* (2006.01)
*G06F 3/06* (2006.01)
*G06F 12/02* (2006.01)

(52) U.S. Cl.
CPC .......... *G06F 3/0611* (2013.01); *G06F 3/0659* (2013.01); *G06F 3/0679* (2013.01);
(Continued)

(58) Field of Classification Search
CPC ...... G06F 3/061; G06F 3/0611; G06F 3/0613; G06F 3/064; G06F 3/0652; G06F 3/0659;
(Continued)

(56) References Cited

U.S. PATENT DOCUMENTS 9,570,159 B1  2/2017  Wakchaure et al.
9,679,658 B2  6/2017  Pelster et al.
(Continued)

FOREIGN PATENT DOCUMENTS

KP    20230142047 A  * 10/2023

OTHER PUBLICATIONS

International Search Report and Written Opinion dated May 7, 2024 in International Patent Application No. PCT/US2023/085400, pp. 1-9.
(Continued)

*Primary Examiner* — Tammara R Peyton
(74) *Attorney, Agent, or Firm* — Byrne Poh LLP

(57) ABSTRACT

Mechanisms for improving read command processing times in a solid-state drive (SSD) are provided, the mechanisms comprising: determining a workload type of an SSD; in response to determining that the workload type is a pure read workload type: determining at least one command size into which an original background write is to be split-up using at least one hardware processor; and splitting-up the background write into a plurality of split background writes, each having one of the determined at least one command size. In some embodiments, the at least one command size accounts for a page of the physical medium of the SSD. In some embodiments, the at least one command size includes at least two different sizes. In some embodiments, the mechanisms further comprise combining two or more split background writes. In some embodiments, the original background write is split-up before being placed in a channel queue.

15 Claims, 7 Drawing Sheets

(52) U.S. Cl.
CPC ............ *G06F 3/061* (2013.01); *G06F 3/0613* (2013.01); *G06F 12/0246* (2013.01); *G06F 12/0253* (2013.01); *G06F 2212/1016* (2013.01); *G06F 2212/1024* (2013.01); *G06F 2212/1044* (2013.01); *G06F 2212/7205* (2013.01); *G06F 2212/7208* (2013.01)

(58) Field of Classification Search
CPC ............... G06F 3/0679; G06F 12/0246; G06F 12/0253; G06F 2212/1016; G06F 2212/1024; G06F 2212/1044; G06F 2212/7205; G06F 2212/7208; G06F 3/00; G06F 3/06; G06F 12/02
USPC .......................................... 711/103, 170, 173
See application file for complete search history.

(56) References Cited

U.S. PATENT DOCUMENTS

| | | | |
|---|---|---|---|
| 9,940,022 | B1 | 4/2018 | Bitner |
| 10,042,768 | B1 | 8/2018 | Karnowski et al. |
| 10,789,130 | B1 | 9/2020 | Horspool et al. |
| 12,079,514 | B2* | 9/2024 | Urrinkala ............... G06F 3/0673 |
| 2010/0180105 | A1 | 7/2010 | Asnaashari |
| 2010/0199033 | A1 | 8/2010 | Nguyen |
| 2010/0262721 | A1 | 10/2010 | Asnaashari |
| 2010/0287333 | A1 | 11/2010 | Lee et al. |
| 2011/0010490 | A1 | 1/2011 | Kwon |
| 2012/0159052 | A1 | 6/2012 | Lee |
| 2012/0159474 | A1 | 6/2012 | Chakhaiyar |
| 2012/0278664 | A1 | 11/2012 | Kazui et al. |
| 2013/0067144 | A1 | 3/2013 | Namba et al. |
| 2014/0025873 | A1 | 1/2014 | Nguyen |
| 2014/0258596 | A1* | 9/2014 | Kojima ............... G06F 12/0246 711/103 |
| 2015/0261452 | A1* | 9/2015 | Moon ................... G06F 3/0679 711/103 |
| 2016/0179404 | A1 | 6/2016 | Nanduri et al. |
| 2017/0090802 | A1 | 3/2017 | Margetts |
| 2017/0147244 | A1 | 5/2017 | Matsumura |
| 2017/0147258 | A1 | 5/2017 | Kim |
| 2017/0228154 | A1 | 8/2017 | Liu et al. |
| 2017/0336978 | A1 | 11/2017 | Fanning |
| 2018/0067797 | A1 | 3/2018 | Miao et al. |
| 2018/0173461 | A1 | 6/2018 | Carroll |
| 2018/0232157 | A1 | 8/2018 | Seo |
| 2018/0335981 | A1 | 11/2018 | Yoshida et al. |
| 2019/0042111 | A1 | 2/2019 | Garcia et al. |
| 2019/0043593 | A1 | 2/2019 | Guo |
| 2019/0050312 | A1 | 2/2019 | Li |
| 2019/0065086 | A1 | 2/2019 | Margetts |
| 2019/0121546 | A1 | 4/2019 | La Fratta |
| 2019/0146669 | A1 | 5/2019 | Madraswala et al. |
| 2019/0146679 | A1* | 5/2019 | Doh ....................... G06F 3/0659 711/103 |
| 2019/0163403 | A1 | 5/2019 | Madraswala |
| 2019/0243577 | A1 | 8/2019 | Pelster et al. |
| 2020/0117369 | A1 | 4/2020 | Pelster et al. |
| 2021/0081137 | A1 | 3/2021 | Nakashima et al. |
| 2021/0279188 | A1 | 9/2021 | Goss et al. |
| 2021/0279196 | A1 | 9/2021 | Jinn et al. |
| 2021/0303173 | A1* | 9/2021 | Wu ....................... G06F 3/0611 |
| 2021/0326172 | A1 | 10/2021 | Muthiah et al. |
| 2022/0011971 | A1 | 1/2022 | Kao |
| 2022/0027069 | A1 | 1/2022 | Henze et al. |

OTHER PUBLICATIONS

Notice of Allowance dated Jun. 20, 2023 in U.S. Appl. No. 16/712,647, pp. 1-26.
U.S. Appl. No. 16/712,647, filed Dec. 12, 2019, pp. 1-14.
U.S. Appl. No. 18/373,480, filed Sep. 27, 2023, pp. 1-23.
Office Action dated Jan. 19, 2023 in U.S. Appl. No. 16/712,647, pp. 1-23.
Office Action dated May 22, 2024 in U.S. Appl. No. 18/373,480, pp. 1-15.
Office Action dated Oct. 1, 2024 in U.S. Appl. No. 18/373,480, pp. 1-32.

* cited by examiner

SYSTEM METHOD FOR IMPROVING READ COMMAND PROCESS TIMES IN SOLID-STATE DRIVES (SSD) BY HAVING PROCESSOR SPLIT-UP BACKGROUND WRITES BASED ON DETERMINED COMMAND SIZE

BACKGROUND

Solid-state drives (SSDs) are widely used in general and special purpose computers such as desktop computers, laptop computers, tablet computers, servers, mobile phones, Internet of Things (IoT) devices, among many others.

Typically, all writes to SSDs are predominantly made using an optimal data size for better write performance. The same size is typically used for background writes as well. For example, in some cases, writes are made with an optimal data size of 128 KB (e.g., writes are made to two quad planes, where each quad plane is four pages and each page is 16 kB of data for 2*4*16 kB=128 KB).

Certain SSDs (e.g., NAND SSDs) only allow one of a write command (also referred to as a program command) and a read command to be transmitted from the SSDs' controllers to the SSDs' physical media (e.g., a NAND device of a NAND SSD) at a time. An earlier-initiated background write (a type of write command) transmission (e.g., for garbage collection, read disturb relocation, and metadata) to an SSDs' physical media must be completed before a later-received read command can be transmitted to the NAND SSDs' physical media. This can negatively impact host read latencies of the SSDs.

Accordingly, new mechanism for improving read command processing times in solid-state drives are desirable.

SUMMARY

In accordance with some embodiments, mechanisms (which can include systems, methods, and media) for improving read command processing times in solid-state drives are provided.

In some embodiments, systems for improving read command processing times in a solid-state drive (SSD) are provided, the systems comprising: memory; and at least one hardware processor collectively configured to at least: determine a workload type of an SSD; in response to determining that the workload type is a pure read workload type: determine at least one command size into which an original background write is to be split-up; and split-up the background write into a plurality of split background writes, each having one of the determined at least one command size. In some of these embodiments, the at least one command size accounts for a page of the physical medium of the SSD. In some of these embodiments, the at least one command size includes at least two different sizes. In some of these embodiments, the at least one hardware processor is also collectively configured to at least combine two or more split background writes. In some of these embodiments, the original background write is split-up before being placed in a channel queue. In some of these embodiments, the background write is split-up after being placed in a channel queue.

In some embodiments, methods for improving read command processing times in a solid-state drive (SSD) are provided, the methods comprising: determining a workload type of an SSD; in response to determining that the workload type is a pure read workload type: determining at least one command size into which an original background write is to be split-up; and splitting-up the background write into a plurality of split background writes, each having one of the determined at least one command size. In some of these embodiments, the at least one command size accounts for a page of the physical medium of the SSD. In some of these embodiments, the at least one command size includes at least two different sizes. In some of these embodiments, the methods further comprise combining two or more split background writes. In some of these embodiments, the original background write is split-up before being placed in a channel queue. In some of these embodiments, the background write is split-up after being placed in a channel queue.

In some embodiments, non-transitory computer-readable medium containing computer executable instructions that, when executed by a processor, cause the processor to perform a method for improving read command processing times in a solid-state drive (SSD) are provided, the method comprising: determining a workload type of an SSD; in response to determining that the workload type is a pure read workload type: determining at least one command size into which an original background write is to be split-up; and splitting-up the background write into a plurality of split background writes, each having one of the determined at least one command size. In some of these embodiments, the at least one command size accounts for a page of the physical medium of the SSD. In some of these embodiments, the at least one command size includes at least two different sizes. In some of these embodiments, the method further comprises combining two or more split background writes. In some of these embodiments, the original background write is split-up before being placed in a channel queue. In some of these embodiments, the background write is split-up after being placed in a channel queue.

DETAILED DESCRIPTION

In accordance with some embodiments, mechanisms (which can include systems, methods, and media) for improving read command processing times in solid-state drives (SSDs) are provided.

In some embodiments, when it is detected that an SSD is entering a pure-read workload type (which can include a pure-read, low-queue-depth workload type, in some embodiments), the mechanisms described herein can split-up a background write into smaller background writes. As a result, when a subsequent read command is received and one of the smaller background writes is being transmitted to the SSD's physical media, the read command does not have to wait for the larger, unsplit-up background write to be transmitted but instead has to wait for the smaller background write to be transmitted.

As used herein, an "original background write" refers to a background write in its form before being split-up; a "split background write" refers to a background write resulting from a splitting-up of an original background write; and an "unsplit background write" refers to a background write resulting from rejoining any two or more split background writes, and that unsplit background write may be the same or different than in size than the corresponding original background write.

Figure 1:
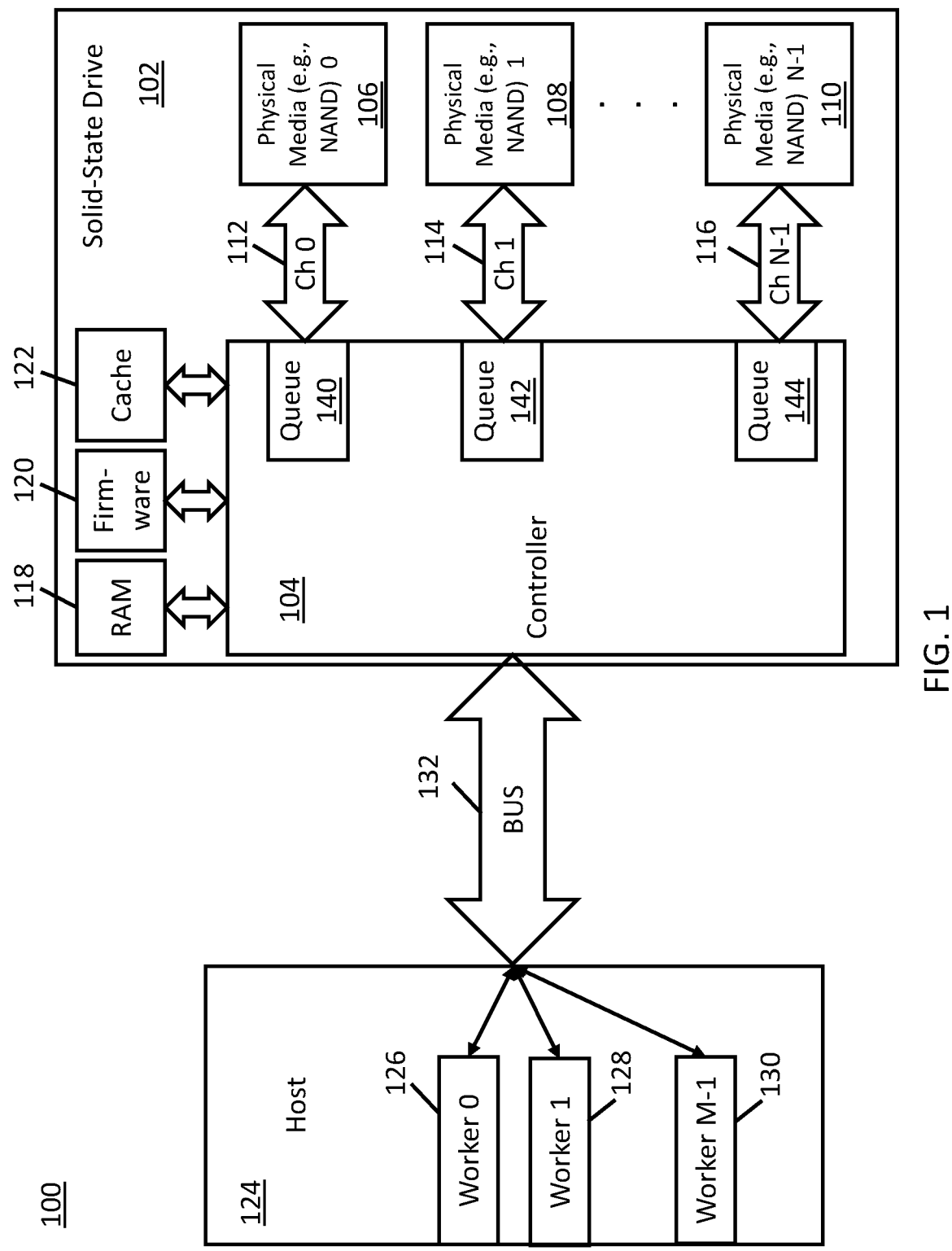
FIG. 1 is an example of block diagram of an SSD coupled to a host device via a bus in accordance with some embodiments.

Turning to FIG. 1, an example block diagram of a solid-state drive 102 coupled to a host device 124 via a bus 132 in accordance with some embodiments is illustrated.

As shown, solid-state drive 102 can include a controller 104, physical media (e.g., NAND devices) 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc. In some embodiments, controller 104 can be coupled to, or include (as shown), channel queues 140, 142, and 144 for transmitting commands (which can include command data) over channels 140, 142, and 144 to physical media 106, 108, and 110, respectively.

Physical media 106, 108, and 110 can be any suitable physical media for storing information (which can include data, programs, and/or any other suitable information that can be stored in a solid-state drive) in some embodiments. For example, the physical media can be NAND devices in some embodiments.

The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media (such as single-level cell (SLC) NAND devices, multilevel cell (MLC) NAND devices, triple-level cell (TLC) NAND devices, quad-level cell (QLC) NAND devices, 3D NAND devices, etc.) can be used in some embodiments. Each physical media can have any suitable size in some embodiments. While physical media 106, 108, and 110 can be implemented using NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers W can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2:
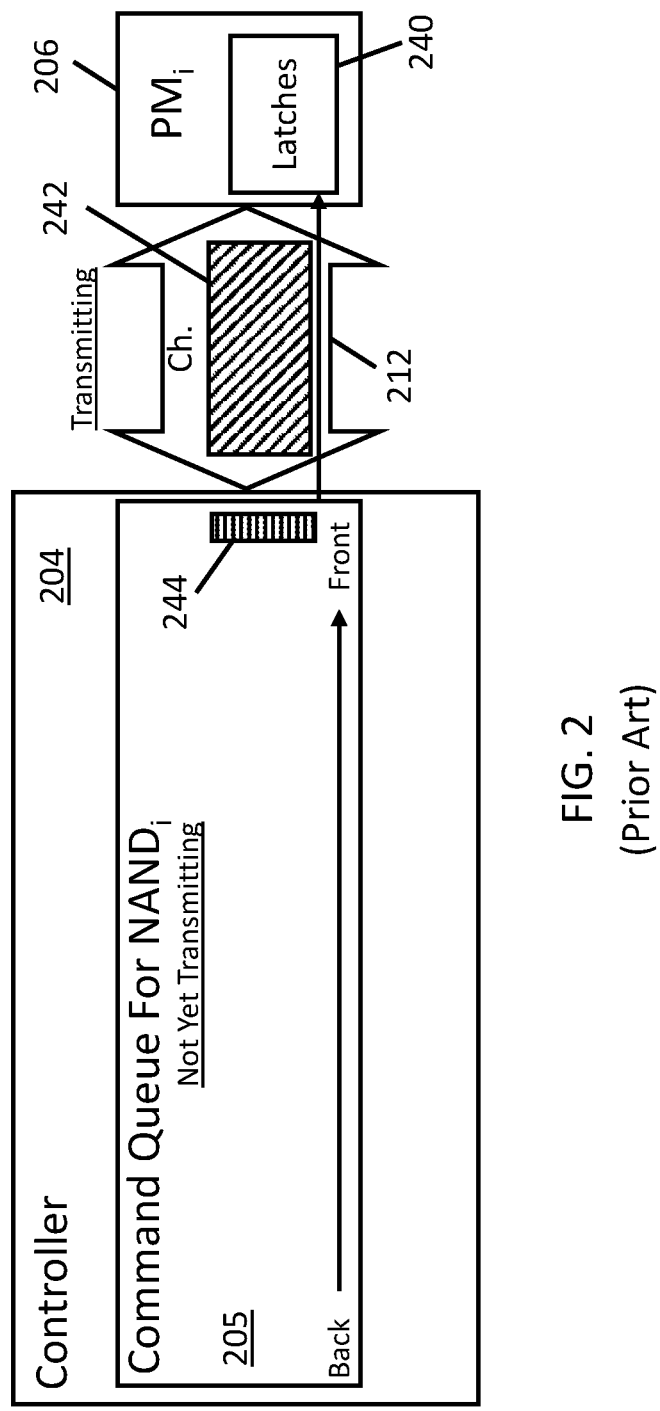
FIG. 2 is an illustration a background write delaying a read command as occurs in the prior art.

Turning to FIG. 2, an example of a pure read command waiting for a background write transmission in accordance with the prior art is illustrated. As shown, an SSD controller 204 has a channel queue 205. At some point in time, a background write 242 of a given size has begun transmitting across channel 212 to latches 240 of physical media 206. After background write 242 has started transmitting, a read command 244 enters queue 205 and must wait for the background write to finish transmitting before it can be transmitted to physical media 206. For example, if the background write is 128 KB (or any other size), then the read command would need to wait for all 128 KB (or other size) to be transmitted over the channel before the read command can be transmitted over the channel.

Figure 3A:
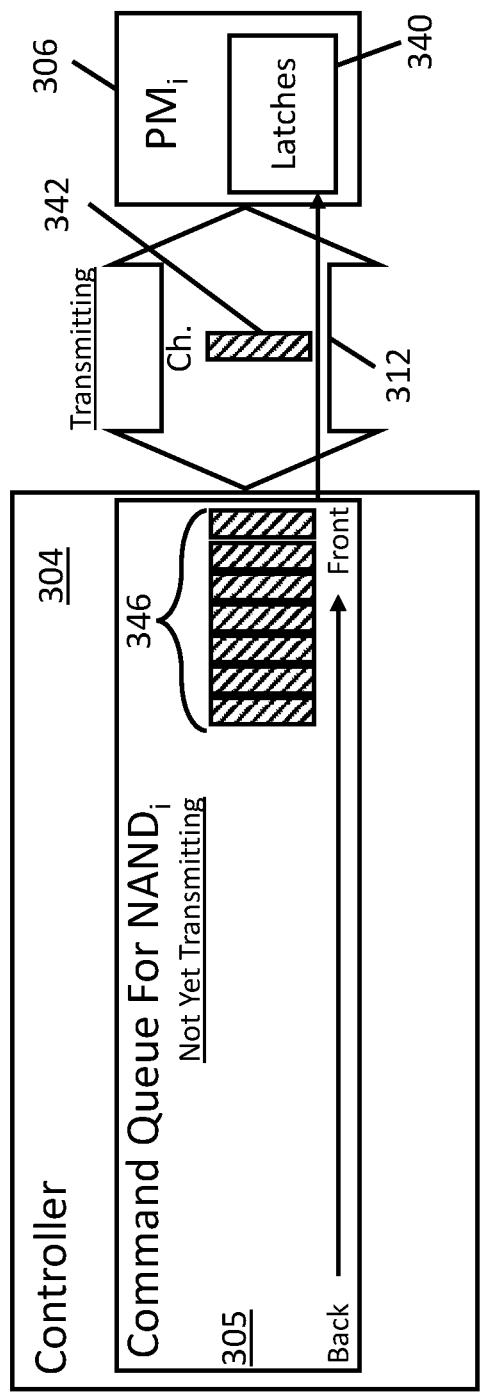
FIG. 3A-3C are example illustrations of how mechanisms described herein can split-up background writes to improve read command latency, and re-assemble split-up background writes when being split-up is not needed, in accordance with some embodiments.
Figure 3B:
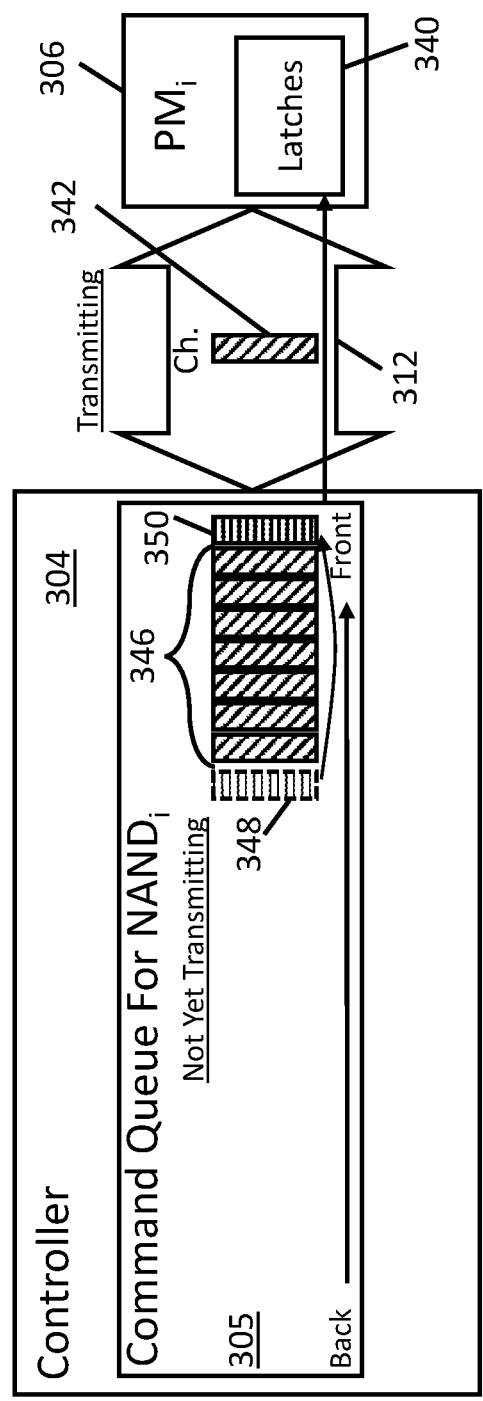
Figure 3C:
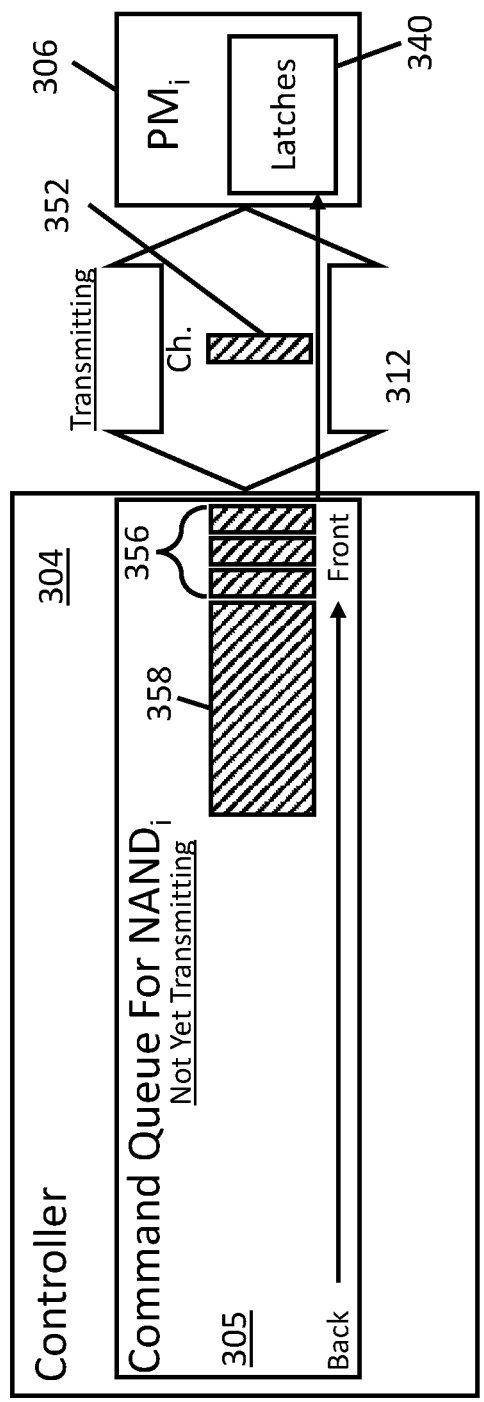

Turning to FIGS. 3A-3C, example illustrations of splitting-up and re-assembling background writes (BGWs) in accordance with some embodiments are shown.

As illustrated in FIG. 3A, in some embodiments, when a pure read workload is detected and a read command is anticipated, the mechanisms described herein can split-up an original BGW into any suitable size components. For example, as illustrated, an original BGW can be split-up into a first split BGW 342 and other split BGWs 346, in some embodiments. Once formed, first split BGW 342 can be transmitted over channel 312 to latches 340 of physical media 306. While the first split BGW is transmitting, the other split BGWs wait in channel queue 305 of controller 304.

The original BGW that is split-up can be any suitable size in some embodiments. For example, in some embodiments, the original BGW that is split-up can be 128 kB.

The split BGWs can be any suitable size in some embodiments. For example, the split BGWs can have a size equal to the minimum page write size for a physical medium (e.g., a NAND device) to which the command is destined. More particularly, for example, when the minimum page write size of a physical medium (such as physical medium 306) to which an original BGW is destined is 16 kB, the original BGW can be split-up into split BGWs having 16 kB of data.

As illustrated in FIG. 3B, a read command 348 is received after the original BGW has been split-up into first split BGW 342 and other split BGWs 346 and the first split BGW has begun transmitting as described in connection with FIG. 3A. This read command is then moved to the front of queue 305 to become read command 350. While read command 350 still waits for first split BGW 342 to complete transmitting before it can be transmitted to latches 340 of physical medium 306, the read command needs to wait a shorter period of time than it would had original BGW not been split-up since the first split BGW is smaller than the original BGW.

As illustrated in FIG. 3C, in some embodiments, if the mechanisms detect that a pure read workload is no longer in effect, newly arriving BGWs can be not split-up as shown by BGW 358, while already split BGWs 352 (which is being transmitted) and 356 (which are still in queue 305) remain in their current form. In some embodiments, when the mechanisms detect that a pure read workload is no longer in effect, any suitable number of already split BGWs can be combined together to form one or more unsplit BGWs.

Figure 4:
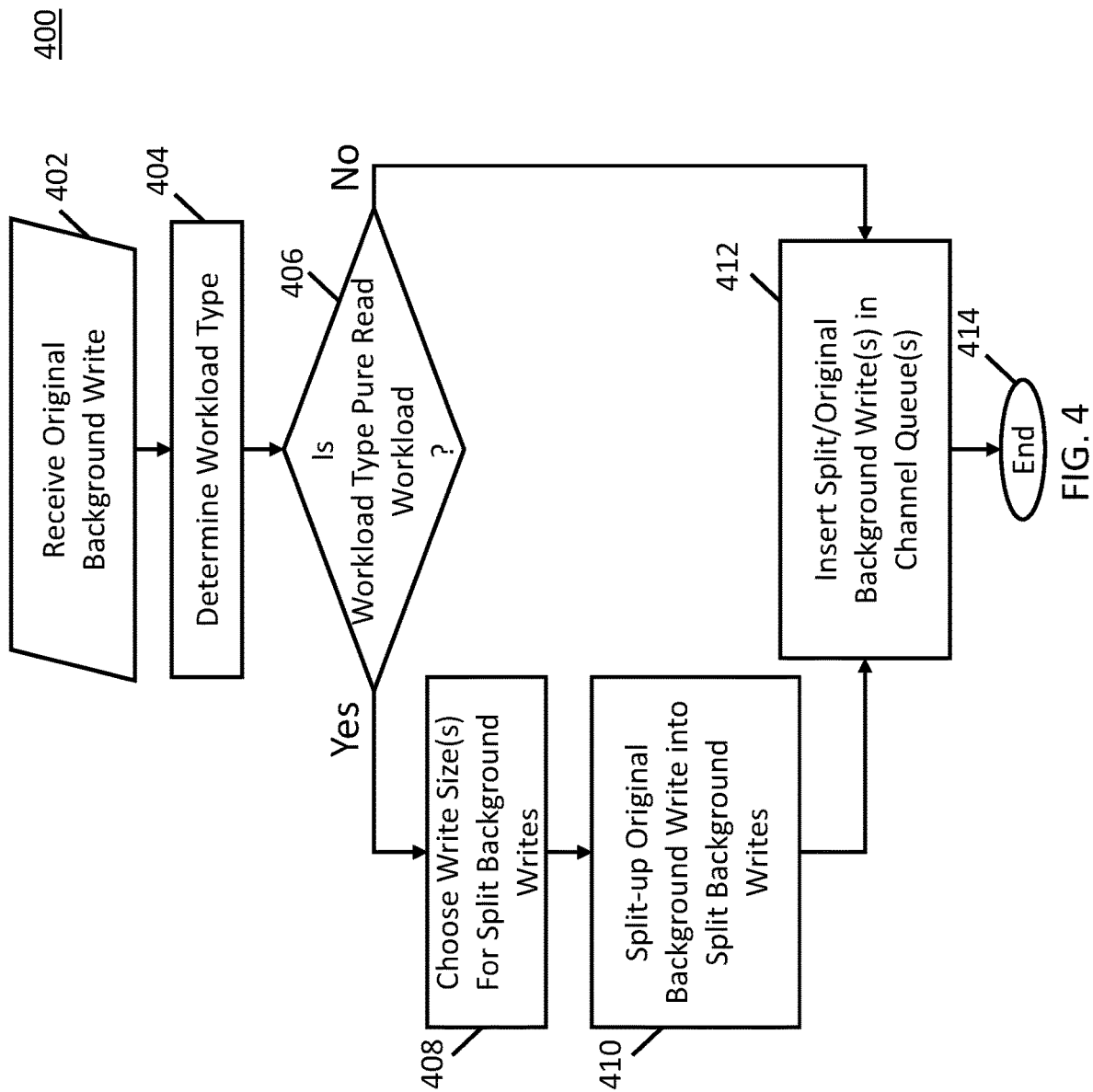
FIG. 4 is an example of a process for splitting-up background writes when received in accordance with some embodiments.

Turning to FIG. 4, an example 400 of a process for splitting up background writes (BGWs) when received in accordance with some embodiments is shown. This process can be performed on any suitable device. For example, in some embodiments, this process can be performed on a controller of an SSD (e.g., such as controller 104 of FIG. 1). In accordance with some embodiments, a different instance of this process can be executed for each physical medium i of an SSD (e.g., each NAND device 106, 108, and 110 on solid-state drive 102).

As shown, process 400 can begin at 402 by receiving an original BGW. Any suitable original BGW can be received, and that BGW can be received in any suitable manner, in some embodiments. For example, the original BGW that is received can be a garbage collection/defrag BGW, in some embodiments. As another example, the BGW can be received from a garbage collection/defrag process executing in controller 104 of FIG. 1, in some embodiments. In some embodiments, the process 400 can be modified by, for example, having steps rearranged, changed, added, and/or removed.

Next, at 404, process 400 can determine a workload type of the SSD. This determination can be made in any suitable manner in some embodiments. For example, in some embodiments, this determination can be made by tracking all the command types that go through the firmware per unit time before they are inserted into a physical media command queue, and, based on distribution of command types per unit time (e.g., all commands are of type host read for 100 ms), a workload type determination can be made.

Then, at 406, process 400 can determine if the workload type is a pure read workload type. If it is determined that the workload type is a pure read workload type, the process can branch to 408 at which it chooses the write size(s) for the split BGWs. Any suitable one or more sizes can be chosen in some embodiments. For example, in some embodiments, all of the split BGWs can be of the same size and that size can be equal to the size needed to contain one page worth of data. As another example, the original BGW can be spit-up into two or more different sizes.

At 410, process 400 can split-up the original BGW into split BGWs of the size(s) determined at 408. This splitting up can be performed in any suitable manner in some embodiments. For example, in some embodiments, this splitting up can be performed by splitting up the default write dispatch size (64 kB) of the background write into four separate 16 kB size background writes.

After splitting up the original BGW at 410, or determining that the workload is not a pure read workload 406, the split BGWs (if coming from 410) or the original BGW (if coming from 406) can be inserted into a channel queue at 412. The insertion(s) can be made to any suitable channel queue, in some embodiments. This insertion can be performed in any suitable manner in some embodiments. For example, in some embodiments, this inserting can be performed by sending the split-up background writes separately into the channel queue or sending the default write dispatch size background write into the channel queue in the case the workload is not a pure read workload.

Figure 5:
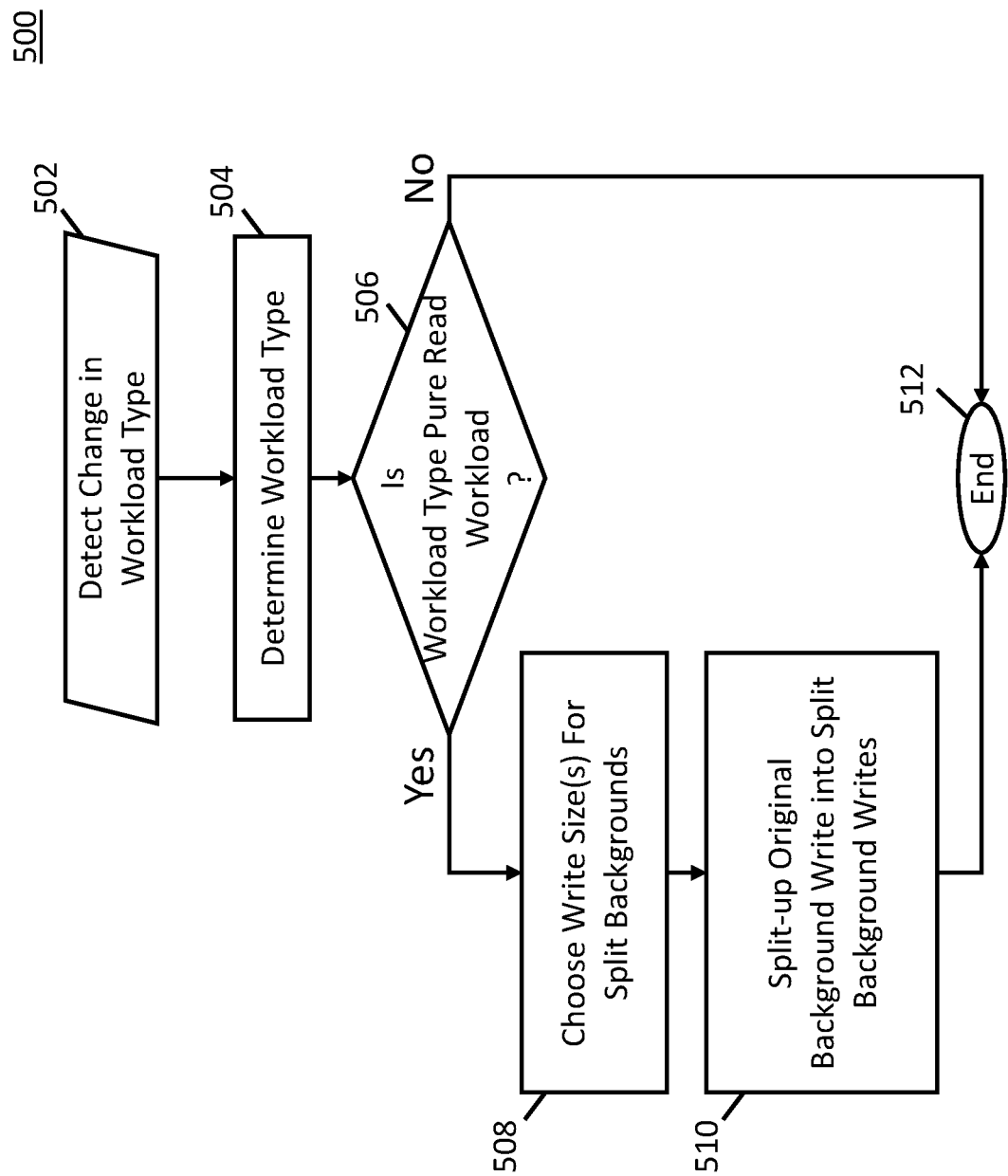
FIG. 5 is an example of a process for splitting-up background writes already in a queue for transmission to an SSD's physical media in accordance with some embodiments.

Turning to FIG. 5, an example 500 of a process for splitting up background writes (BGWs) that are in a channel queue (such as channel queue 305 described above in connection with FIGS. 3A-3C) in accordance with some embodiments is shown. This process can be performed on any suitable device. For example, in some embodiments, this process can be performed on a controller of an SSD (e.g., such as controller 104 of FIG. 1). In accordance with some embodiments, a different instance of this process can be executed for each physical medium i of an SSD (e.g., each physical medium 106, 108, and 110 on SSD 102). In some embodiments, the process 500 can be modified by, for example, having steps rearranged, changed, added, and/or removed.

As shown, process 500 can begin at 502 by detecting a change in workload type. Detecting a change in workload type can be performed in any suitable manner, in some embodiments. For example, in some embodiments, detecting a change in workload type can be performed by tracking all the command types that go through the firmware per unit time before they are inserted into a physical media command queue, and, based on distribution of command types per unit time (e.g., all commands are of type host read for 100 ms), a change in workload type determination can be made.

Next, at 504, process 500 can determine a workload type of the SSD. This determination can be made in any suitable manner in some embodiments. For example, in some embodiments, this determination can be made by tracking all the command types that go through the firmware per unit time before they are inserted into a physical media command queue, and, based on distribution of command types per unit time (e.g., all commands are of type host read for 100 ms), a workload type determination can be made.

Then, at 506, process 500 can determine if the workload type is a pure read workload. If it is determined that the workload type is a pure read workload, the process can branch to 508 at which it chooses the write size(s) for the split BGWs. Any suitable one or more sizes can be chosen in some embodiments. For example, in some embodiments, all of the split BGWs can be of the same size and that size can be equal to the size needed to contain one page worth of data. As another example, the original BGW can be spit-up into two or more different sizes.

At 510, process 500 can split-up the original BGW in to split BGWs of the size(s) determined at 508. This splitting up can be performed in any suitable manner in some embodiments. For example, in some embodiments, this splitting up can be performed by splitting up the default write dispatch size (64 KB) of the background write into four separate 16 kB size background writes and sending them separately into the channel queue.

After splitting up the original BGW at 510, or determining that the workload is not a pure read workload at 506, process 500 can end at 512.

In some embodiments, at least some of the above-described blocks of the processes of FIGS. 4 and 5 can be executed or performed in any order or sequence not limited to the order and sequence shown in and described in connection with the figures. Also, some of the above blocks of the processes of FIGS. 4 and 5 can be executed or performed substantially simultaneously where appropriate or in parallel to reduce latency and processing times in some embodiments. Additionally or alternatively, some of the above described blocks of the processes of FIGS. 4 and 5 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for improving read command processing times in SSDs are provided. These mechanisms improve read latency in pure read workloads by splitting up background writes so that read commands can be sent to physical media of the SSDs more quickly.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for improving read command processing times in a solid-state drive (SSD), comprising:
   memory; and
   at least one hardware processor collectively configured to at least:
      determine a workload type of an SSD;
      in response to determining that the workload type is a pure read workload type:
         determine at least one command size into which an existing background write is to be split-up; and
         split-up the existing background write into a plurality of split background writes, each having one of the determined at least one command size; and
      combine two or more split background writes.

2. The system of claim 1, wherein the at least one command size accounts for a page of the physical medium of the SSD.

3. The system of claim 1, wherein the at least one command size includes at least two different sizes.

4. The system of claim 1, wherein the existing background write is split-up before being placed in a channel queue.

5. The system of claim 1, wherein the existing background write is split-up after being placed in a channel queue.

6. A method for improving read command processing times in a solid-state drive (SSD), comprising:
   determining a workload type of an SSD;
   in response to determining that the workload type is a pure read workload type:
      determining at least one command size into which an existing background write is to be split-up using at least one hardware processor;
      splitting-up the existing background write into a plurality of split background writes, each having one of the determined at least one command size; and
   combining two or more split background writes.

7. The method of claim 6, wherein the at least one command size accounts for a page of the physical medium of the SSD.

8. The method of claim 6, wherein the at least one command size includes at least two different sizes.

9. The method of claim 6, wherein the existing background write is split-up before being placed in a channel queue.

10. The method of claim 6, wherein the existing background write is split-up after being placed in a channel queue.

11. A non-transitory computer-readable medium containing computer executable instructions that, when executed by a processor, cause the processor to perform a method for improving read command processing times in a solid-state drive (SSD), the method comprising:
    determining a workload type of an SSD;
    in response to determining that the workload type is a pure read workload type:
       determining at least one command size into which an existing background write is to be split-up; and
       splitting-up the existing background write into a plurality of split background writes, each having one of the determined at least one command size; and
    combining two or more split background writes.

12. The non-transitory computer-readable medium of claim 11, wherein the at least one command size accounts for a page of the physical medium of the SSD.

13. The non-transitory computer-readable medium of claim 11, wherein the at least one command size includes at least two different sizes.

14. The non-transitory computer-readable medium of claim 11, wherein the existing background write is split-up before being placed in a channel queue.

15. The non-transitory computer-readable medium of claim 11, wherein the existing background write is split-up after being placed in a channel queue.

\* \* \* \* \*